US008693555B2

(12) United States Patent
Matsumoto

(10) Patent No.: US 8,693,555 B2
(45) Date of Patent: Apr. 8, 2014

(54) COMMUNICATION SYSTEM
(75) Inventor: Tadashi Matsumoto, Osaka (JP)
(73) Assignee: Panasonic Corporation, Osaka (JP)
(*) Notice: Subject to any disclaimer, the term of this patent is extended or adjusted under 35 U.S.C. 154(b) by 44 days.
(21) Appl. No.: 13/574,647
(22) PCT Filed: Jan. 25, 2011
(86) PCT No.: PCT/JP2011/051326
§ 371 (c)(1),
(2), (4) Date: Aug. 9, 2012
(87) PCT Pub. No.: WO2011/090206
PCT Pub. Date: Jul. 28, 2011
(65) Prior Publication Data
US 2012/0307918 A1 Dec. 6, 2012
(30) Foreign Application Priority Data Jan. 25, 2010 (JP) ................................. 2010-013347

(51) Int. Cl.
*H04B 3/54* (2006.01)
(52) U.S. Cl.
USPC ........... 375/257; 375/259; 375/262; 375/295; 375/316; 375/340
(58) Field of Classification Search
CPC ............ H04B 3/548; H04B 2203/547; H04B 2203/5479; H04B 2203/5495; H04B 3/58; H04B 14/002; H04B 2203/5458; H04B 3/542; H04B 2203/5437; H04B 2203/5445; H04L 25/028; H04L 25/0292
USPC ......... 375/257, 258, 259, 135, 136, 219, 222, 375/269, 271, 295, 299, 316, 322, 340, 342, 375/346, 347
See application file for complete search history.

(56) References Cited

U.S. PATENT DOCUMENTS 6,922,135 B2 *  7/2005  Abraham ................... 340/12.38
7,170,394 B2 *  1/2007  Chandler et al. ........... 340/12.32
(Continued)

FOREIGN PATENT DOCUMENTS

JP  54-040303 B2  12/1979
JP  54-040304 B2  12/1979
(Continued)

OTHER PUBLICATIONS

International Search Report for corresponding International Application No. PCT/JP2011/051326 mailed Mar. 1, 2011.
(Continued)

*Primary Examiner* — Hirdepal Singh
(74) *Attorney, Agent, or Firm* — Renner, Otto, Boisselle & Sklar, LLP

(57) ABSTRACT

A communication terminal is provided with: first and second transmission units transmitting signals on a communication line, first and second receiving units receiving signals from another communication terminal; and a communication method switching unit switching the signal communication method. The first transmission unit transmits an electrical current signal to the communication line. The first receiving unit receives a voltage signal obtained by converting, by means of a current/voltage conversion unit, the electrical current signal transmitted from the first transmission unit. The second transmission unit transmits a communication signal to the communication line as a voltage signal. The second receiving unit receives the voltage signal transmitted from the second transmission unit. The communication method switching unit switches between an electrical current transmission method in which transmission is performed by the first transmission unit, and a voltage transmission method in which transmission is performed by the second transmission unit.

36 Claims, 8 Drawing Sheets

(56) References Cited

U.S. PATENT DOCUMENTS

| | | | |
|---|---|---|---|
| 7,865,169 B2 * | 1/2011 | Okazaki et al. | 455/402 |
| 7,965,195 B2 * | 6/2011 | Deaver et al. | 340/660 |
| 8,207,635 B2 * | 6/2012 | Covaro | 307/112 |
| 8,274,972 B2 * | 9/2012 | Park | 370/360 |
| 8,446,977 B2 * | 5/2013 | Ovchinnikov | 375/288 |
| 8,537,698 B2 * | 9/2013 | Matsumoto et al. | 370/252 |
| 2004/0138786 A1 * | 7/2004 | Blackett et al. | 700/295 |
| 2012/0228927 A1 * | 9/2012 | Matsumoto et al. | 307/3 |
| 2013/0089120 A1 * | 4/2013 | Kasai et al. | 375/145 |
| 2013/0181630 A1 * | 7/2013 | Taipale et al. | 315/224 |

FOREIGN PATENT DOCUMENTS

| | | |
|---|---|---|
| JP | 57-037264 B2 | 8/1982 |
| JP | 08-274742 A | 10/1996 |
| JP | 2008-244882 A | 10/2008 |
| JP | 2008-244884 A | 10/2008 |

OTHER PUBLICATIONS

Form PCT/ISA/237 for corresponding International Application No. PCT/JP2011/051326 dated Mar. 1, 2011.

* cited by examiner

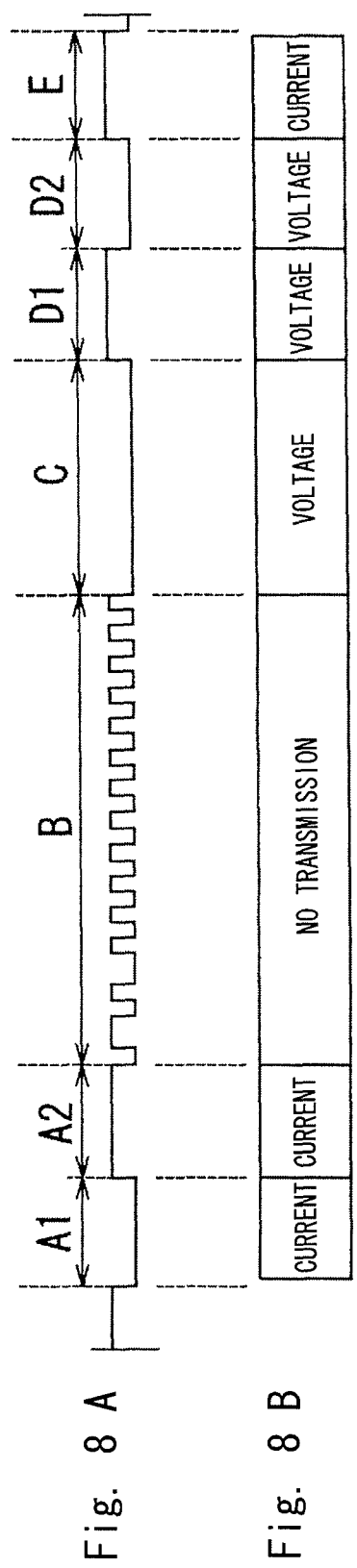

COMMUNICATION SYSTEM

TECHNICAL FIELD

The present invention relates to a communication system having a plurality of communication terminals connected to a two-wire communication line and a power supply apparatus that applies a voltage between the two wires of the communication line.

BACKGROUND ART

In a known conventional communication system, a master (a transmission unit) and a plurality of communication terminals (slaves) are connected to a communication line (transmission line) such that communication is performed between the respective communication terminals and the master. In an example of this type of communication system, the master monitors the conditions of the respective communication terminals periodically, and when the condition of a communication terminal varies, the master transmits a signal to another communication terminal so that dealing with the condition variation (see Patent Documents 1 to 3, for example).

In this configuration, however, the communication terminals always communicate via the master. Because the master polls the communication terminals, a communication speed is slow. As a result, the system is unsuitable for transmitting information including comparatively large data amount, for example an analog quantity. Further, when the master breaks down or the like, the entire system stops, and therefore reliability as a communication system is poor.

In response to this problem, it has been proposed a communication system in which the communication terminals connected to the communication line are configured to communicate directly via peer to peer (P2P) communication, thereby increasing the communication speed so that information including a comparatively large data amount can be transmitted. This communication system typically employ a line power feeding method in which the master is used as a power supply apparatus and electric power is supplied from the single master to the plurality of communication terminals via the communication line.

Incidentally, in a communication system where the communication terminals directly communicate with each other, as described above, a plurality of terminals (the master and the communication terminals) are connected to the two-wire communication line. Therefore, input impedances of the respective terminals are connected in parallel via the communication line. Hence, in order to perform communication between the communication terminals using a voltage signal, the impedances of the terminals connected to the communication line must be increased. For example, the master serves as a power supply apparatus and therefore includes a smoothing capacitor or the like at an output stage thereof. As a result, the master exhibits comparatively low impedance. Therefore, a high impedance module (not shown) that exhibits high impedance relative to the voltage signal on the communication line must be connected between this type of terminal and the communication line so as to increase the input impedance relative to a signal component. If, for example, a constructor forgets to connect the high impedance module, the impedance of the communication line is to decrease, and as a result, it may be impossible to establish communication between the communication terminals.

Hence, when the communication system described above is introduced, it requires a great labor to examine onsite conditions and the like, and it leads to an increased load on a constructor. As a result, the communication system cannot be introduced easily.

A communication system may be configured to transmit a current signal over the communication line by configuring that connecting a transmission unit of the communication terminal to the communication line and varying a current flowing through the communication line from the master serving as the power supply apparatus. In this case, a receiving unit of the communication terminal is configured to receive a voltage signal obtained by converting the current signal transmitted from the transmission unit through a current/voltage conversion unit provided between the master and the communication line.

Hence, signal transmission from the communication terminal is performed through the current signal, and signal reception in the communication terminal is performed through the voltage signal obtained by converting the current signal through the current/voltage conversion unit. By employing a current signal as the signal transmitted from the communication terminal, communication can be performed even when the impedance of the communication line decreases. As a result, it can reduce the labor required to examine the onsite conditions and the like during introduction of the communication system, and it leads to a reduction in the load on the constructor. Therefore, the communication system can be introduced easily.

PRIOR ART DOCUMENTS

Patent Documents

Patent Document 1: Japanese Patent Publication No. 1180690
Patent Document 2: Japanese Patent Publication No. 1195362
Patent Document 3: Japanese Patent Publication No. 1144477

SUMMARY OF THE INVENTION

Problems to be Resolved by the Invention

In adapting above described current transmission method in which a current signal is transmitted from a communication device, a voltage must be applied between the two wires of the communication line from the master which servers as the power supply apparatus. Therefore, when power feeding from the master to the communication line is stopped due to a breakdown of the master or during maintenance thereof, all of the communication terminals connected to the communication line become incapable of communication.

The present invention has been designed in consideration of the problems described above, and an object thereof is to provide a communication system which can communicate even when an impedance of a communication line decreases as well as can continue to communicate even when power feeding from a power supply apparatus to the communication line is stopped.

Means of Solving the Problems

To solve the problems described above, a communication system according to the present invention includes a plurality of communication terminals connected to a two-wire communication line, a power supply apparatus that applies a voltage between two wires of the communication line, and a current/voltage conversion unit that converts current change on the communication line into voltage change on the communication line by means of a voltage drop in a resistance component, wherein the communication terminal includes: a signal generation unit that generates a communication signal on the basis of information to be transmitted; a first transmission unit that is connected to the communication line and transmits a current signal to the communication line by changing a current flowing from the communication line in accordance with variation in the communication signal; a second transmission unit that is connected to the communication line and applies the communication signal to the communication line as a voltage signal; a receiving unit that receives a voltage signal of voltage change into which the current signal transmitted from the first transmission unit is converted through the current/voltage conversion unit, and also receives the voltage signal transmitted from the second transmission unit; and a communication method switching unit that switches between a current transmission method in which the communication signal is transmitted through the first transmission unit and a voltage transmission method in which the communication signal is transmitted through the second transmission unit in accordance with a predetermined communication switching rule.

According to this configuration, the communication terminal is capable of operating while switching between the current transmission method, in which the communication signal is transmitted in the form of a current signal from the first transmission unit, and the voltage transmission method, in which the communication signal is transmitted in the form of a voltage signal from the second transmission unit. Hence, the communication terminal can be, for example, configured to use the current transmission method at normal times, and to switch the communication method to the voltage transmission method when power feeding from the power supply apparatus to the communication line is stopped. In this configuration, the communication system can communicate at normal times even when the impedance of the communication line decreases. Also, the communication system can continue the communication even when the power feeding from the power supply apparatus to the communication line is stopped. Here, a resistance element may be used as the resistance component of the current/voltage conversion unit. Alternatively, a characteristic impedance of the communication line itself, an output impedance of the power supply apparatus, and so on may be used as the resistance component.

The communication terminal preferably further includes: a line power feeding unit that receives a supply of power from the power supply apparatus via the communication line; a local power feeding unit that receives a supply of power from an external power supply without passing through the communication line; and a power feeding method switching unit that switches between a line power feeding method in which a supply of operating power is received through the line power feeding unit and a local power feeding method in which a supply of operating power is received through the local power feeding unit in accordance with a predetermined power feeding switching rule.

According to this configuration, the communication terminal is capable of switching between the line power feeding method and the local power feeding method. Therefore, the communication terminal can be, for example, configured to use the line power feeding method in which the power is supplied from the power supply apparatus at normal times, and to switch into the local power feeding method when power feeding from the power supply apparatus to the communication line is stopped so as to continue communication.

The power feeding method switching unit preferably uses the power feeding switching rule decided: to select the line power feeding method during an operation of the current transmission method; and also to select the local power feeding method during an operation of the voltage transmission method.

According to this configuration, the communication terminal operates using the line power feeding method during an operation of the current transmission method, and operates using the local power feeding method during an operation of the voltage transmission method. Therefore, a favorable power feeding method can be selected in accordance with the communication method.

The power supply apparatus preferably includes stopping means for stopping power feeding to the communication line when an output falls below a prescribed value, the communication terminal preferably further includes a power feeding monitoring unit that monitors a power feeding condition on the communication line, and the communication method switching unit preferably uses the communication switching rule decided to switch to the voltage transmission method when power feeding from the power supply apparatus to the communication line is stopped during an operation of the current transmission method.

According to this configuration, when the output of the power supply apparatus decreases due to a power cut or the like during an operation of the current transmission method such that communication of the current transmission method cannot be continued, the communication method is switched to the voltage transmission method, and as a result, communication can be continued.

The communication terminal preferably further includes a capacity evaluation unit that determines a leeway value by subtracting a current value through the communication line from a current capacity of the power supply apparatus, and the communication method switching unit preferably uses the communication switching rule decided to switch to the voltage transmission method when the leeway value determined by the capacity evaluation unit falls below a predetermined value during an operation of the current transmission method.

According to this configuration, when there becomes little leeway in the current capacity of the power supply apparatus due to an increase in a number of communication terminals or the like during an operation of the current transmission method such that communication of the current transmission method becomes unstable, stable communication can be continued by switching to the voltage transmission method.

The communication terminal preferably further includes a signal monitoring unit that monitors a signal level of the voltage signal on the communication line, and the communication method switching unit preferably uses the communication switching rule decided to switch to the current transmission method when the signal level of the voltage signal on the communication line falls below a predetermined value during an operation of the voltage transmission method.

According to this configuration, when the signal level of the voltage signal decreases due to a reduction in an impedance of the communication line or the like during an operation of the voltage transmission method such that communication of the voltage transmission method becomes unstable, stable communication can be continued by switching to the current transmission method.

The power supply apparatus preferably includes a signal transmission unit that transmits a transmission signal constituted by a voltage signal to the communication line by varying a magnitude of the voltage applied to the communication line, and a terminal device that communicates with the power supply apparatus using the transmission signal is preferably connected to the communication line.

According to this configuration, when there already exists a communication system in which communication is performed between a power supply apparatus and a terminal device using a transmission signal, communication between the communication terminals can be realized by making effective use of the communication line of the existing communication system.

The terminal device preferably functions to return a current mode signal, which is transmitted by short-circuiting the communication line via an appropriate low impedance, to the power supply apparatus in synchronization with a return period included in the transmission signal, and the communication method switching unit preferably uses the communication switching rule decided: to perform communication through the voltage transmission method during the return period of the transmission signal; and also to perform communication through the current transmission method during a period other than the return period of the transmission signal.

According to this configuration, the communication terminal operates of the voltage transmission method during the return period of the transmission signal, and operates of the current transmission method during a period other than the return period of the transmission signal. As a result, it can avoid the interference between the current mode signal returned from the terminal device to the power supply apparatus and the current signal transmitted to the communication line from the first transmission unit of the communication terminal.

Note that, the communication system may employ a current/voltage conversion unit that converts current change on the communication line into voltage change on the communication line by means of a voltage drop in an impedance component, instead of the current/voltage conversion unit that converts current change on the communication line into voltage change on the communication line by means of a voltage drop in the resistance component.

Hence, the communication system includes a plurality of communication terminals and a power supply apparatus. The plurality of communication terminals are connected to a two-wire communication line. The power supply apparatus is configured to apply a voltage between the two wires of the communication line by supplying power between the two wires. The communication system also includes a current/voltage conversion unit. The current/voltage conversion unit is configured to convert current change on the communication line into voltage change on the communication line by means of a voltage drop in an impedance component. The communication terminal includes a signal generation unit, a first transmission unit, a second transmission unit, a receiving unit, and a communication method switching unit. The signal generation unit is configured to generate a communication signal on the basis of information to be transmitted. The first transmission unit is connected to the communication line and configured to transmit a current signal to the communication line by changing a current flowing from the communication line in accordance with variation in the communication signal. The second transmission unit is connected to the communication line and configured to apply the communication signal to the communication line as a voltage signal. The receiving unit is configured to receive a voltage signal of voltage change into which the current signal transmitted from the first transmission unit is converted through the current/voltage conversion unit. The receiving unit is also configured to receive the voltage signal transmitted from the second transmission unit. The communication method switching unit is configured to switch between a current transmission method and a voltage transmission method in accordance with a predetermined communication switching rule. In the current transmission method, the communication signal is transmitted through the first transmission unit. In the voltage transmission method, the communication signal is transmitted through the second transmission unit.

According to this configuration, the communication terminal is capable of operating while switching between the current transmission method, in which the communication signal is transmitted in the form of a current signal through the first transmission unit, and the voltage transmission method, in which the communication signal is transmitted in the form of a voltage signal through the second transmission unit. Hence, the communication terminal can be, for example, configured to use the current transmission method at normal times so as to be able to communicate even when the impedance of the communication line decreases, and to switch the communication method to the voltage transmission method when power feeding from the power supply apparatus to the communication line is stopped such that the communication can be continued.

In the present invention, the communication terminal includes the communication method switching unit for switching between the current transmission method and the voltage transmission method. Hence, by using the current transmission method at normal times, for example, communication remains possible even when the impedance of the communication line decreases, and by switching to the voltage transmission method when power feeding from the power supply apparatus to the communication line is stopped, communication can be continued.

BRIEF DESCRIPTION OF THE DRAWINGS

FIG. 8 is an illustrative view showing a format of a transmission signal used in the second embodiment.

BEST MODE FOR CARRYING OUT THE INVENTION

First Embodiment

Figure 1:
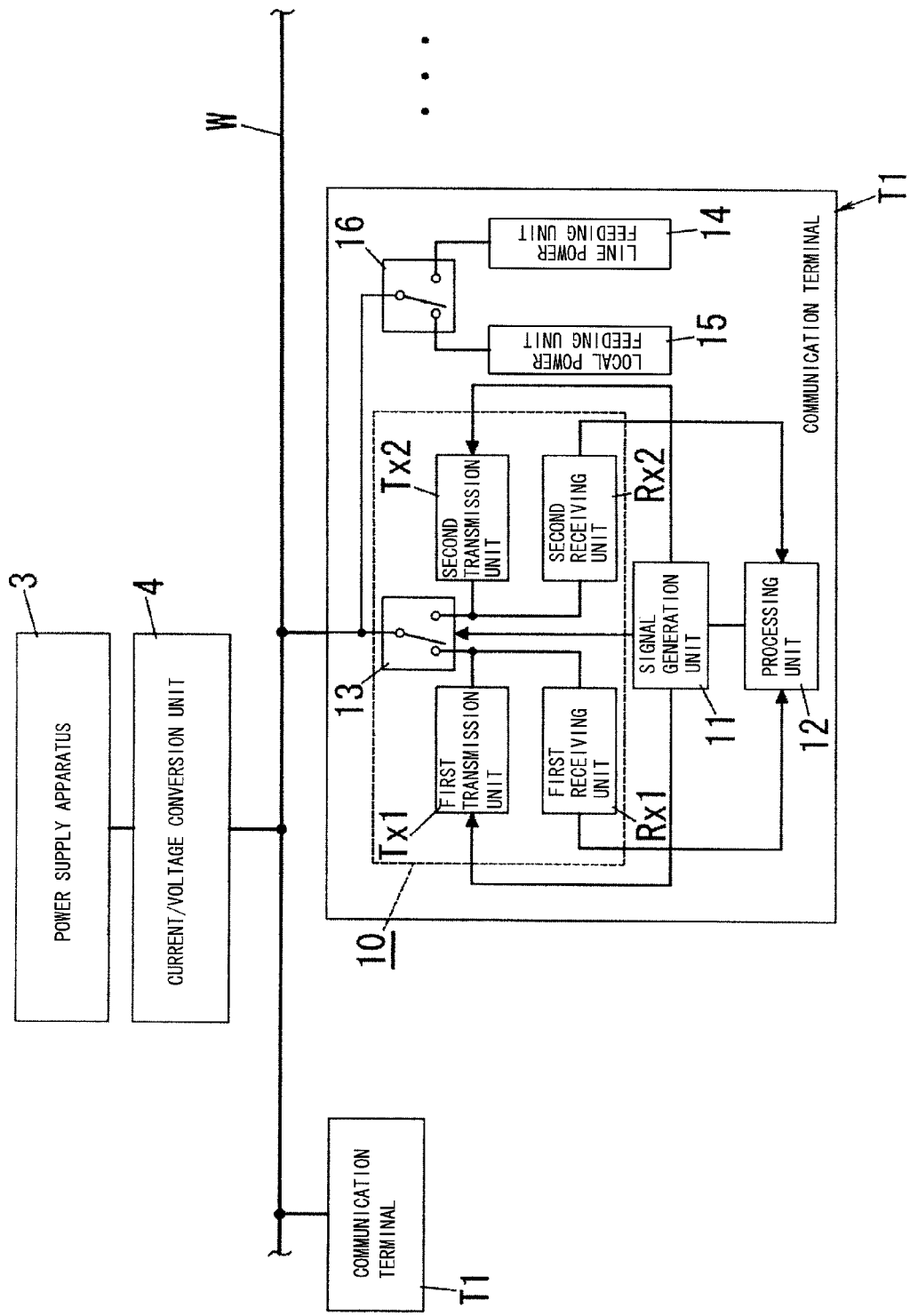
FIG. 1 is a schematic system diagram showing a configuration of a first embodiment of the present invention.

As shown in FIG. 1, a communication system according to this embodiment includes a power supply apparatus 3 connected to a two wire communication line W, and a plurality of communication terminals T1 connected to the communication line W so as to communicate with each other directly. Further, a current/voltage conversion unit 4 for converting current change on the communication line W into voltage change on the communication line W is provided in the communication system between the power supply apparatus 3 and the communication line W. The power supply apparatus 3 applies a voltage (a direct current voltage) between the two wires of the communication line W.

In this embodiment, a monitored device (not shown) that outputs monitoring information to be transmitted between the communication terminals T1 is connected to a part of the plurality of communication terminals T1. Further, a monitoring apparatus (not shown) is connected to another communication terminal T1 to obtain the monitoring information from the communication terminal T1.

In other words, the communication terminals T1 perform communication (data transmission) via the communication line W, but the monitored device generates data (monitoring information) to be transmitted and the monitoring apparatus processes received data. Here, the communication terminals T1 function as adapters that perform communication by converting data from the monitored device or the monitoring apparatus connected thereto and transmitting the data over the communication line W. The monitored device and the monitoring apparatus exchange data with the communication terminals T1 by performing communication periodically. Note that a power gauge that measures an amount of power consumed by a lighting device may be cited as an example of the monitored device, and a meter apparatus that displays the consumed power measured by the power gauge may be cited as an example of the monitoring apparatus.

The current/voltage conversion unit 4 is constituted by a resistance element inserted between an output terminal of the power supply apparatus 3 and the communication line W. Here, it is sufficient for the resistance element to be inserted into at least one of the two wires of the communication line W, but in this embodiment, resistance elements are inserted into both wires and resistance values of the two resistance elements are set to be identical. With this configuration, the current/voltage conversion unit 4 converts current change on the communication line W into voltage change on the communication line W by means of a voltage drop in the resistance element.

Note that the current/voltage conversion unit 4 is not limited to a resistance element inserted between the output terminal of the power supply apparatus 3 and the communication line W, and instead of the resistance element, an impedance element may be employed as the current/voltage conversion unit 4. In this case, the current/voltage conversion unit 4 converts current change on the communication line W into voltage change on the communication line W by means of a voltage drop in the impedance element.
[stop here]
Further, in this embodiment, the resistance elements inserted into the two wires of the two wire communication line W have identical resistance values. It is not, however, necessary to insert resistance elements having identical resistance values into the two wires of the two wire communication line W. The resistance elements are inserted into both wires to secure equilibrium on the line. In other words, it is sufficient for a resistance element or an impedance element to be inserted into at least one of the two wires of the two wire communication line W. Furthermore, resistance elements or impedance elements are preferably inserted into both of the two wires of the two wire communication line W. In this case, the resistance values of the resistance elements inserted into the two wires of the two wire communication line W may be different. Similarly, impedance values of impedance elements inserted into the two wires of the two wire communication line W may be different. The resistance values of the resistance elements inserted into the two wires of the two wire communication line W are preferably identical. Similarly, the impedance values of the impedance elements inserted into the two wires of the two wire communication line W are preferably identical.

In actuality, however, a characteristic impedance of the communication line W itself has a large effect as a resistance component (or an impedance component) of the current/voltage conversion unit that converts current change on the communication line W into voltage change on the communication line W. Moreover, not only the characteristic impedance of the communication line W but also all resistance components (or impedance components) existing between the transmission side communication terminal T1 and the power supply apparatus 3, such as an output impedance of the power supply apparatus 3, can be used as the current/voltage conversion unit. Hence, resistance components (or impedance components) such as the characteristic impedance of the communication line W and the output impedance of the power supply apparatus 3 can be used as the current/voltage conversion unit instead of providing a new resistance element.

As described above, an impedance element may be employed instead of a resistance element. Hence, impedance components such as the characteristic impedance of the communication line W and the output impedance of the power supply apparatus 3 can likewise be used as the current/voltage conversion unit instead of providing a new impedance element.

As shown in FIG. 1, the communication terminal T1 includes a transceiving unit 10 that transmits and receives a signal to and from another communication terminal T1, a signal generation unit 11 that generates a communication signal to be transmitted from the transceiving unit 10, and a processing unit 12 that performs control processing on respective parts. Note that FIG. 1 shows the configuration of only one communication terminal T1, but it may be assumed that all of the communication terminals T1 are configured identically.

The signal generation unit 11 generates the communication signal on the basis of information to be transmitted, received from the monitored device, and the processing unit 12 outputs the information obtained from the communication signal to the monitoring apparatus. In other words, the communication terminal T1 transmits data (monitoring information) obtained from the monitored device from the transceiving unit 10 to another communication terminal T1, and outputs data obtained by the transceiving unit 10 from another communication terminal T1 to the monitoring apparatus.

The transceiving unit 10 includes a first transmission unit Tx1 and a second transmission unit Tx2 that transmit communication signals over the communication line W, a first receiving unit Rx1 and a second receiving unit Rx2 that receive communication signals from another communication terminal T1, and a communication method switching unit 13 for switching a communication method. In other words, the transceiving unit 10 includes two transmission units and two receiving units, and the transmission unit and receiving unit to be used for communication are switched by the communication method switching unit 13.

The first transmission unit Tx1 is connected to the communication line W and configured to transmit a first order signal Si constituted by a current signal to the communication line W by changing a current flowing from the communication line W. The first receiving unit Rx1 is configured to receive a second order signal Sv defined as a voltage signal of voltage change into which the first order signal Si transmitted from the first transmission unit Tx1 is converted through the current/voltage conversion unit 4. In other words, when the communication terminal T1 transmits the first order signal Si constituted by a current signal to the communication line W, the current/voltage conversion unit 4 provided between the communication terminal T1 and the power supply apparatus 3 converts the first order signal Si into the second order signal Sv constituted by a voltage signal. As a result, the first receiving unit Rx1 can receive the communication signal transmitted from the first transmission unit Tx1 as a voltage signal.

The second transmission unit Tx2, meanwhile, is configured to transmit a communication signal to the communication line W as a voltage signal, while the second receiving unit Rx2 is configured to receive the voltage signal transmitted from the second transmission unit Tx2.

The communication method switching unit 13 switches between two communication methods, namely the current transmission method in which communication is performed between the first transmission unit Tx1 and the first receiving unit Rx1 using a current signal and the voltage transmission method in which communication is performed between the second transmission unit Tx2 and the second receiving unit Rx2 using a voltage signal, in accordance with a communication switching rule to be described below. Basically, the communication method switching unit 13 alternatively selects a condition in which a combination of the first transmission unit Tx1 and the first receiving unit Rx1 is connected to the communication line W and a condition in which a combination of the second transmission unit Tx2 and the second receiving unit Rx2 is connected to the communication line W.

Thus, the communication terminal T1 performs communication using the current transmission method in the condition where the combination of the first transmission unit Tx1 and the first receiving unit Rx1 is connected to the communication line W, and performs communication using the voltage transmission method in the condition where the combination of the second transmission unit Tx2 and the second receiving unit Rx2 is connected to the communication line W. Note that since both the first receiving unit Rx2 and the second receiving unit Rx2 receive voltage signals from the communication line W, a single receiving unit may double as the first receiving unit Rx1 and the second receiving unit Rx2. In this case, the receiving unit is connected to the communication line W at all times, regardless of the communication method switching unit 13.

In the communication system configured as described above, the communication method of the communication terminal T1 can be switched between the current transmission method and the voltage transmission method, and therefore, by using the respective communication methods appropriately according to conditions, respective advantages thereof can be exploited.

More specifically, in the current transmission method, the signal transmission side communication terminal T1 transmits a signal to the communication line W using the first order signal Si constituted by a current signal, and the signal receiving side communication terminal T1 receives the second order signal Sy defined as a voltage signal of voltage change into which the first order signal Si transmitted from the first transmission unit Tx1 is converted through the current/voltage conversion unit 4. In other words, the communication terminal T1 generates a voltage signal using a voltage drop occurring when a current flows in from the power supply apparatus 3, rather than directly superimposing a voltage signal, and therefore the input impedance of the terminal is less likely to have an effect.

Moreover, in the current transmission method, communication between the communication terminals T1 and T1 remains possible not only in a case where the input impedance of the power supply apparatus 3 from the viewpoint of the communication line W is increased by increasing the impedance of the current/voltage conversion unit 4, but also in a case where the input impedance of the power supply apparatus 3 is reduced. By reducing the input impedance of the power supply apparatus 3, a configuration in which noise is less likely to occur can be realized. In other words, by employing a current signal as the first order signal Si transmitted from the communication terminal T1, the first order signal Si can be transmitted even when a line-to-line impedance of the communication line W is low.

The voltage transmission method differs from the current transmission method in that voltage application from the power supply apparatus 3 to the communication line W is not required. Hence, this method is advantaged in that communication can be continued even when power feeding from the power supply apparatus 3 to the communication line W is stopped due to a breakdown of the power supply apparatus 3 or during maintenance.

Further, in the voltage transmission method, the current flowing through the communication line W during signal transmission is smaller than that of the current transmission method. Furthermore, in the current transmission method, a following ability of the signal deteriorates when a frequency increases such that it may become impossible to secure sufficient amplitude in the communication signal, whereas in the voltage transmission method, sufficient amplitude can be secured in the communication signal even when the frequency is high.

The communication terminal T1 further includes a line power feeding unit 14 that receives a power supply from the power supply apparatus 3 via the communication line W, a local power feeding unit 15 that receives a power supply from a commercial power supply without passing through the communication line W, and a power feeding method switching unit 16 that switches the power feeding unit with which operating power is to be secured. More specifically, the line power supply unit 14 secures a power supply of the communication terminal T1 using power obtained by stabilizing power on the communication line W, while the local power feeding unit 15 secures the power supply of the communication terminal T1 using power obtained by rectifying and stabilizing the commercial power supply.

The power feeding method switching unit 16 switches between the two power feeding methods, namely the line power feeding method in which the line power feeding unit 14 serves as the power supply of the communication terminal T1 and the local power feeding method in which the local power feeding unit 15 serves as the power supply of the communication terminal T1, in accordance with a power feeding switching rule to be described below. Basically, the power feeding method switching unit 16 alternatively selects a condition in which the line power feeding unit 14 is connected to respective circuits of the communication terminal T1 and a condition in which the local power feeding unit 15 is connected to the respective circuits of the communication terminal T1.

With the line power feeding method, the power supply of the communication terminal T1 can be secured even during a power cut as long as the power supply apparatus 3 has a backup function such as a UPS (uninterruptible power supply). With the local power feeding method, meanwhile, the power supply of the communication terminal T1 can be secured even when the power supply from the power supply apparatus 3 is stopped due to a breakdown of the power supply apparatus 3 or during maintenance.

In this embodiment, the power feeding method switching unit 16 switches the power feeding method automatically in alignment with the communication method, using a power feeding switching rule determined such that line power feeding is performed during communication using the current transmission method and local power feeding is performed during communication using the voltage transmission method. Switching the power feeding method in alignment with the communication method in this manner has the following advantages.

During an operation using the current transmission method, the communication terminal T1 must draw in a current from the communication line W in order to perform communication, and therefore a voltage must be applied to the communication line W from the power supply apparatus 3. Hence, when communication is possible using the current transmission method, the communication terminal T1 is naturally capable of operating using the line power feeding method, and therefore the line power feeding method is preferably employed during an operation using the current transmission method. Note that the operating power supply of the respective circuits of the communication terminal T1 can be covered using the local power feeding method even during an operation using the current transmission method, but in this case, communication is impossible unless the power supply of the communication terminal T1 can be secured during a power cut or the like.

When the communication terminal T1 performs communication using the voltage transmission method, on the other hand, the impedance of the communication line W must be increased in advance. Hence, the low impedance power supply apparatus 3 is preferably not connected to the communication line W in order to supply power to the communication terminal T1, and therefore, during an operation using the voltage transmission method, the local power feeding method is preferably employed.

In this embodiment, the communication switching rule used when the communication method switching unit 13 switches the communication method is determined as follows. Note, however, that the communication switching rule may be varied according to the topology, application, and so on of the communication system, and therefore first to third communication switching rules will be described as examples below.

Figure 2:
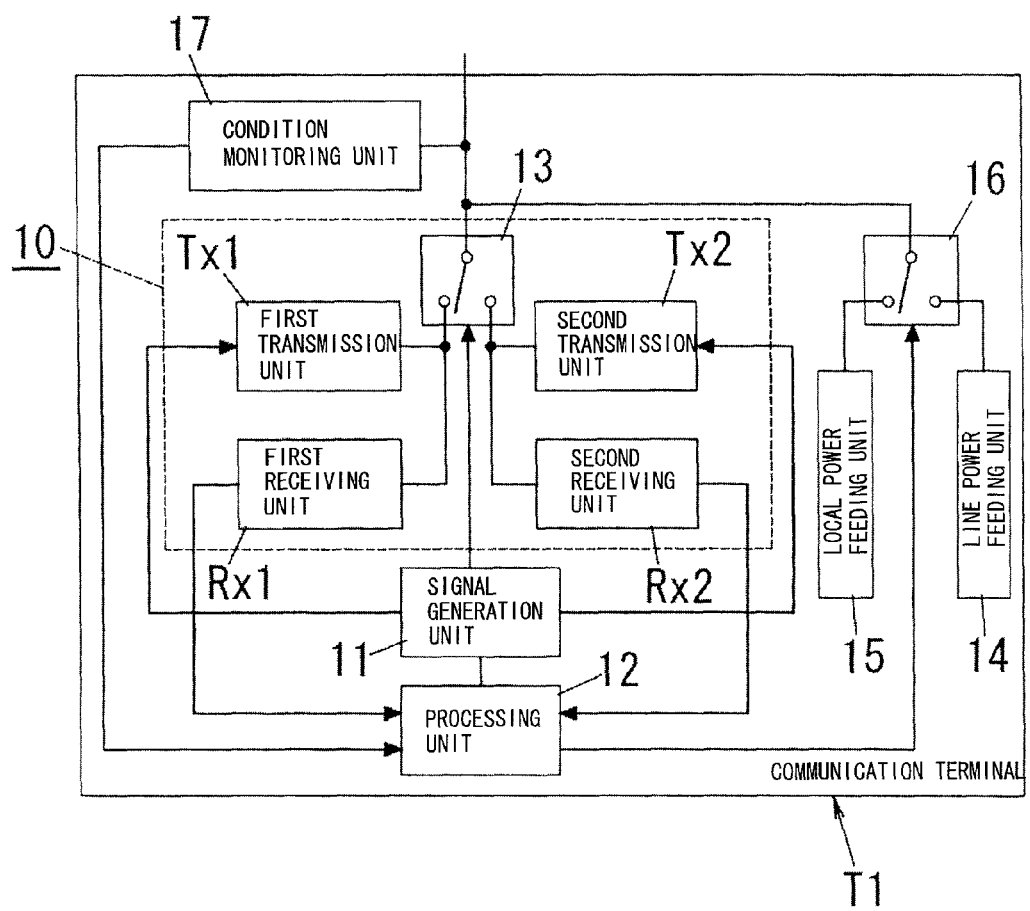
FIG. 2 is a schematic block diagram showing a configuration of a communication terminal according to the first embodiment.

First, the first communication switching rule will be described. When the first communication switching rule is applied, as shown in FIG. 2, the communication terminal T1 further includes a condition monitoring unit 17 that is connected to the communication line W in order to monitor the condition of the communication line W. The condition monitoring unit 17 functions at least as a power feeding monitoring unit that monitors a power feeding condition from the power supply apparatus 3 to the communication line W. An output of the condition monitoring unit 17 is input into the processing unit 12, and the processing unit 12 determines which of the communication methods to use. The power supply apparatus 3, meanwhile, includes stopping means (not shown) for stopping voltage application to the communication line W by cutting an electric connection to the communication line W when the output thereof falls below a prescribed value.

The first communication switching rule is decided to switch the communication method from the current transmission method to the voltage transmission method when power feeding from the power supply apparatus 3 to the communication line W is stopped. The processing unit 12 controls the communication method switching unit 13 in accordance with the communication switching rule. Hence, when the output of the power supply apparatus 3 falls below the prescribed value due to a power cut, a breakdown of the power supply apparatus 3, or the like during an operation in the current transmission method, power feeding from the power supply apparatus 3 to the communication line W is stopped, and therefore the communication method switching unit 13 switches the communication method to the voltage transmission method.

Figure 3:
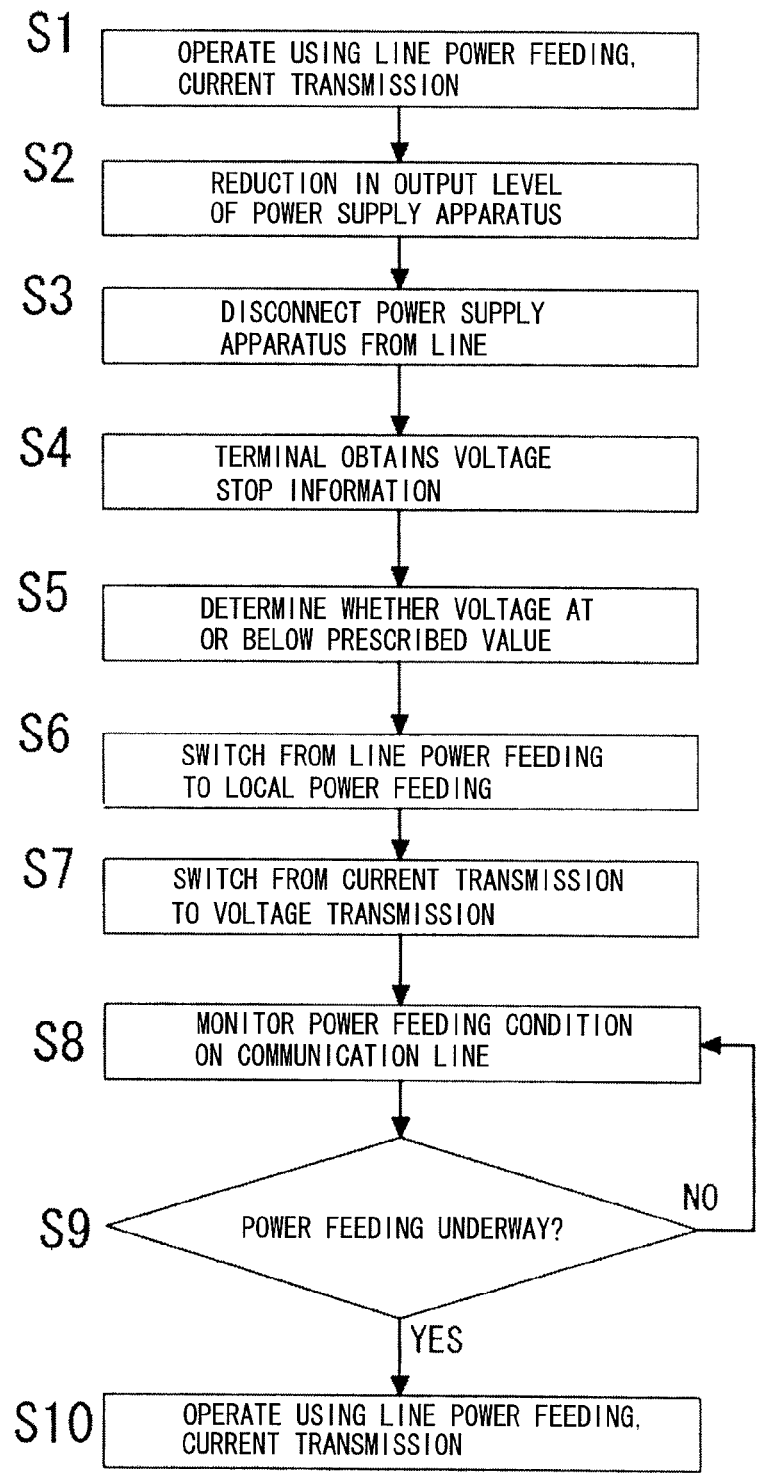
FIG. 3 is a flowchart showing an example of an operation according to the first embodiment.

An operation of the communication terminal T1 performed when the first communication switching rule is applied will now be described using a flowchart shown in FIG. 3.

When the output of the power supply apparatus 3 decreases (S2) during an operation of the communication terminal T1 using the line power feeding method and the current transmission method (S1), the power supply apparatus 3 is disconnected from the communication line W (S3) such that direct application of a voltage from the power supply apparatus 3 to the communication line W is stopped. When, at this time, the voltage on the communication line W monitored by the condition monitoring unit 17 falls below a predetermined value (S4, S5), the communication terminal T1 selects the local power feeding method and the voltage transmission method by use of the power feeding method switching unit 16 and the communication method switching unit 13, respectively (S6, S7).

Thereafter, the communication terminal T1 continues to monitor the power feeding condition on the communication line W by use of the condition monitoring unit 17 (S8), and when power feeding from the power supply apparatus 3 is restored (S9: Yes), returns to an operation of the line power feeding method and the current transmission method (S10).

By applying the first communication switching rule described above, the communication terminal T1 can basically continue communication by selecting the voltage transmission method when the output of the power supply apparatus 3 decreases due to a breakdown or another reason during an operation of the current transmission method.

Next, the second communication switching rule will be described. When the second communication switching rule is applied, the condition monitoring unit 17 functions at least as a signal monitoring unit that monitors a signal level (amplitude) of the voltage signal on the communication line W. The second communication switching rule is determined such that when the signal level of the voltage signal on the communication line W falls below a predetermined value during an operation of the voltage transmission method, as a result of which communication is determined to be impossible, the communication method is switched to the current transmission method. The processing unit 12 then controls the communication method switching unit 13 in accordance with the communication switching rule. Hence, when a low impedance terminal is connected to the communication line W or the like during an operation of the voltage transmission method, causing the impedance of the communication line W to decrease such that the signal level of the voltage signal falls below the predetermined value, the communication method switching unit 13 switches the communication method to the current transmission method.

Figure 4:
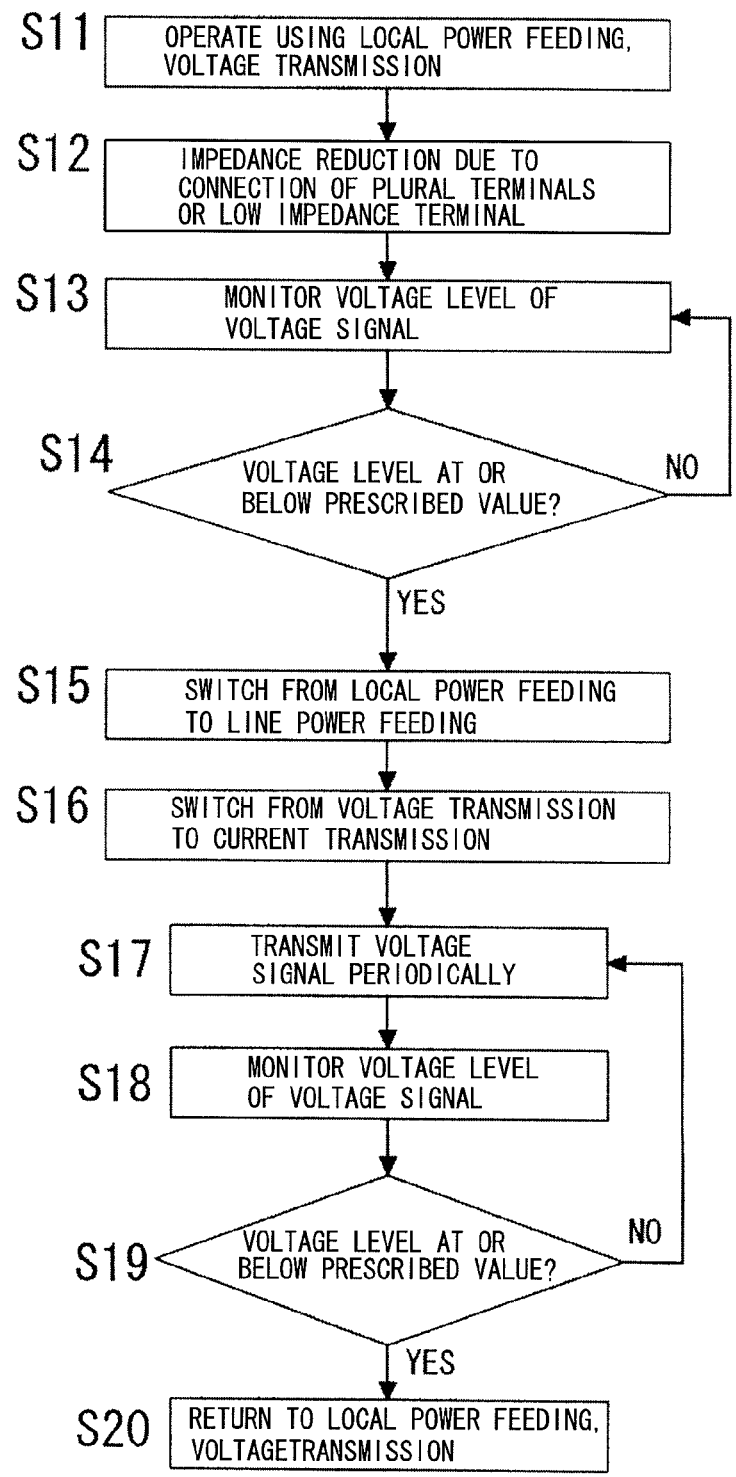
FIG. 4 is a flowchart showing an example of an operation according to the first embodiment.

An operation of the communication terminal T1 performed when the second communication switching rule is applied will now be described using a flowchart shown in FIG. 4.

When the impedance of the communication line W decreases (S12) while the communication terminal T1 performs an operation of the local power feeding method and the voltage transmission method (S11), the signal level of the voltage signal on the communication line W decreases.

When, at this time, the signal level on the communication line W, monitored by the condition monitoring unit 17, falls below a predetermined value (S13, S14), the communication terminal T1 selects the line power feeding method and the current transmission method by use of the power feeding method switching unit 16 and the communication method switching unit 13, respectively (S15, S16).

Thereafter, the condition monitoring unit 17 continues to monitor the signal level of the voltage signal on the communication line W (S18) while the communication terminal T1 transmits voltage signals from the second transmission unit Tx1 periodically (S17). When the signal level recovers to a predetermined value or above (S19: Yes), the communication terminal T1 returns to an operation of the local power feeding method and the voltage transmission method (S20). Note that the predetermined values compared with the signal level need not take identical values during the switch from the voltage transmission method to the current transmission method (S14) and from the current transmission method to the voltage transmission method (S19), and the value of the former case (S14) is preferably set to be lower.

By applying the second communication switching rule described above, the communication terminal T1 basically operates in the voltage transmission method, but is switched to the current transmission method when communication of the voltage transmission method becomes unstable due to the addition of a low impedance terminal or the like. As a result, stable communication can be continued.

Figure 5:
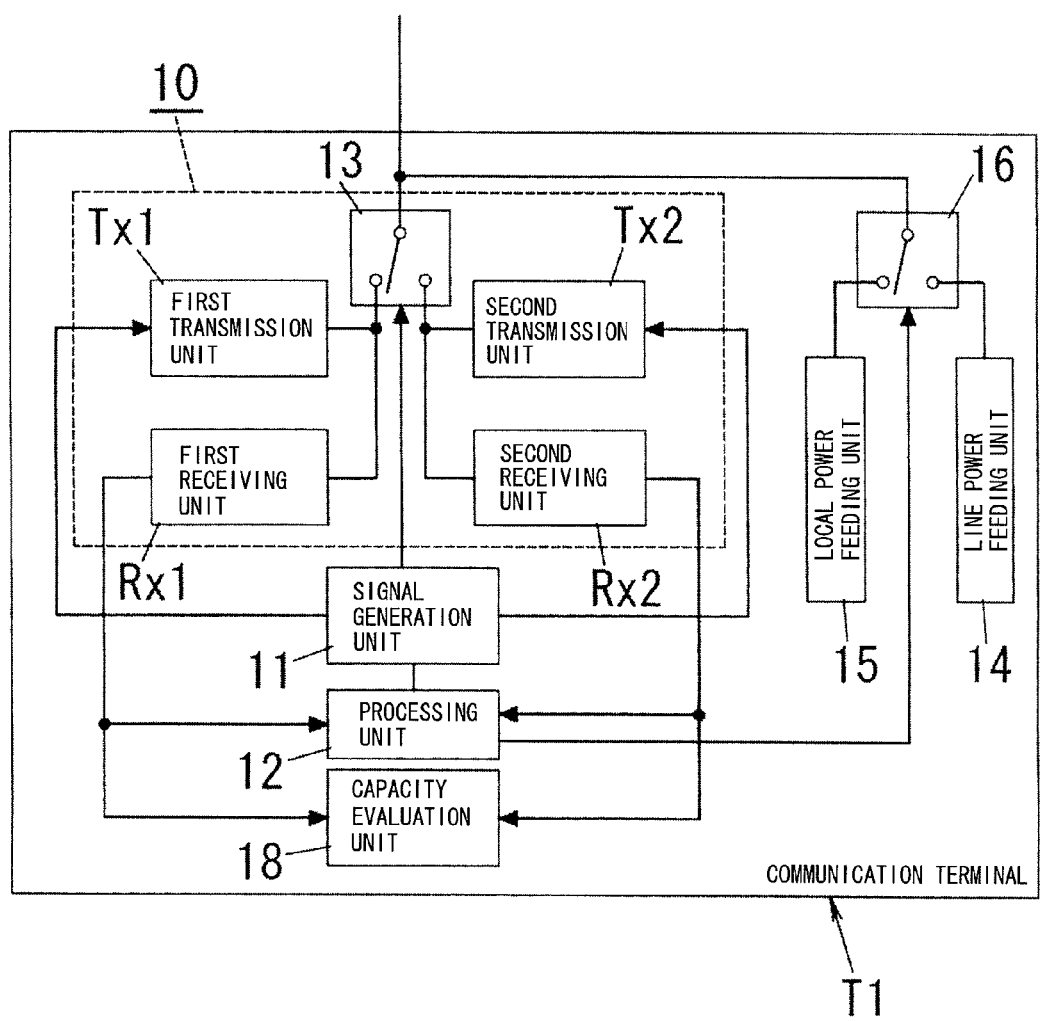
FIG. 5 is a schematic block diagram showing a configuration of a communication terminal according to the first embodiment.

Next, the third communication switching rule will be described. When the third communication switching rule is applied, as shown in FIG. 5, the communication terminal T1 comprises, in place of the condition monitoring unit 17, a capacity evaluation unit 18 that determines a leeway value by comparing a current capacity of the power supply apparatus 3 with a current value on the communication line W. The current capacity of the power supply apparatus 3 is set in the capacity evaluation unit 18 in advance. The current capacity may be set by manual input from an input means for setting input of the current capacity provided in the communication terminal T1, or by transmitting a signal indicating the current capacity from the power supply apparatus 3 to the communication terminal T1. The capacity evaluation unit 18 obtains the current value on the communication line W from reception results of the first reception unit Rx1 and the second reception unit Rx2, and determines the leeway value by subtracting the current value from the current capacity of the power supply apparatus 3.

The third communication switching rule is determined such that the communication method is switched to the voltage transmission method when the leeway value determined by the capacity evaluation unit 18 falls below a predetermined value during an operation of the current transmission method. The processing unit 12 then controls the communication method switching unit 13 in accordance with the communication switching rule. Hence, when the current value on the communication line W increases during an operation of the current transmission method due to an increase in a number of communication terminals T1 performing communication simultaneously or the like, as a result of which the leeway value determined by the capacity evaluation unit 18 falls below the predetermined value, the communication method switching unit 13 switches the communication method to the voltage transmission method.

Figure 6:
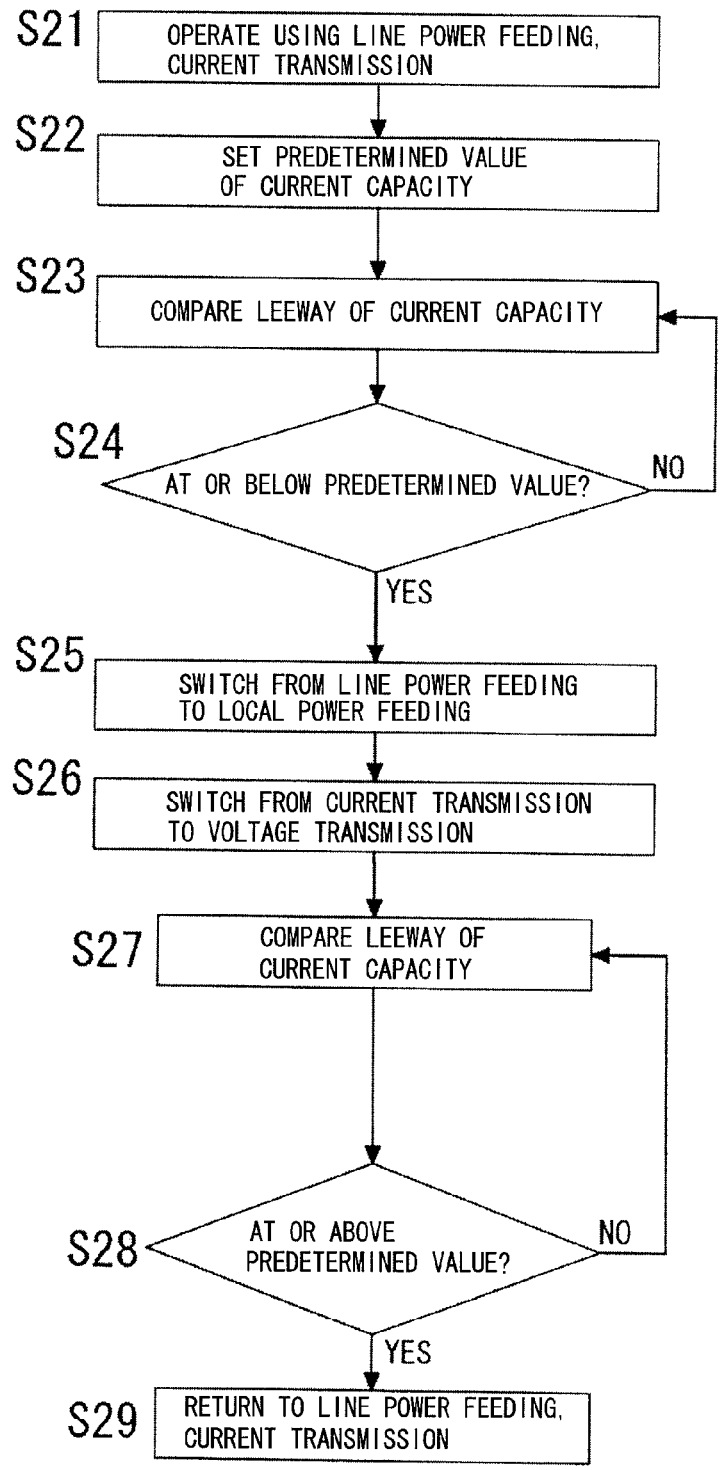
FIG. 6 is a flowchart showing an example of an operation according to the first embodiment.

An operation of the communication terminal T1 performed when the third communication switching rule is applied will now be described using a flowchart shown in FIG. 6.

While the communication terminal T1 performs an operation of the line power feeding method and the current transmission method (S21), the current capacity of the power supply apparatus 3 is set (S22) and the capacity evaluation unit 18 determines the leeway value by comparing the current capacity of the power supply apparatus 3 with the current value on the communication line W (S23). When the leeway value falls below the predetermined value (S24: Yes), the communication terminal T1 is switched to the local power feeding method and the voltage transmission method by the power feeding method switching unit 16 and the communication method switching unit 13, respectively (S25, S26).

Thereafter, the communication terminal T1 continues to monitor the leeway value at the capacity evaluation unit 18 (S27). When the leeway value recovers to or above a predetermined value (S28: Yes), the communication terminal T1 returns to an operation using the line power feeding method and the current transmission method (S29). Note that the predetermined values compared with the leeway value need not take identical values during the switch from the current transmission method to the voltage transmission method (S24) and from the voltage transmission method to the current transmission method (S28), and the value used in the former case (S24) is preferably set to be lower.

By applying the third communication switching rule described above, the communication terminal T1 basically operates though the current transmission method, but is switched to the voltage transmission method when the number of communication terminals T1 increases, leading to a loss of leeway in the current capacity of the power supply apparatus 3 such that communication becomes unstable. As a result, stable communication can be continued.

Further, the communication terminal T1 may apply the first to third communication switching rules individually or in appropriate combinations. In one possible combination, for example, the first communication switching rule is used to switch from the current transmission method to the voltage transmission method while the second communication switching rule is used to switch from the voltage transmission method to the current transmission method.

Note that in the example described in this embodiment, the communication terminal T1 comprises the line power feeding unit 14 and the local power feeding unit 15, and the power feeding method switching unit 16 is capable of switching the power feeding method in accordance with the communication method. The present invention is not limited to this example, however, and the power feeding method switching unit 16 may be configured to switch to an appropriate power feeding method in accordance with the power feeding condition from the power supply apparatus 3 to the line power feeding unit 14 or the power feeding condition from the commercial power supply to the local power feeding unit 15, for example.

Further, the power feeding method switching unit 16 may comprise a switch, and be configured to switch the power feeding method in response to an operation of the switch, regardless of the communication method. Furthermore, the communication terminal T1 may comprise only one of the line power feeding unit 14 and the local power feeding unit 15 such that one power feeding method is employed fixedly.

As described above, the communication system comprises a two-wire communication line, a plurality of communication terminals, and a power supply apparatus. The plurality of communication terminals are connected to the two line type communication line. The power supply apparatus is configured to apply a voltage between the two lines of the communication line. In other words, the power supply apparatus is configured to supply power between the two lines of the communication line such that a voltage is applied between the two lines of the communication line. The communication system also comprises a current/voltage conversion unit. The current/voltage conversion unit is configured to convert current change on the communication line into voltage change on the communication line by means of a voltage drop in a resistance component (an impedance component). The communication terminal comprises a signal generation unit, a first transmission unit, a second transmission unit, a reception unit, and a communication method switching unit. The signal generation unit generates a communication signal on the basis of information to be transmitted. The first transmission unit is connected to the communication line. The first transmission unit is configured to change a current flowing from the communication line in accordance with variation in the communication signal. As a result, the first transmission unit transmits a current signal to the communication line. The second transmission unit is connected to the communication line. The second transmission unit applies the communication signal to the communication line as a voltage signal. The current signal transmitted from the first transmission unit is converted into voltage change by the current/voltage conversion unit. As a result, the current signal transmitted from the first transmission unit is converted into a voltage signal by the current/voltage conversion unit. The reception unit receives the voltage signal obtained when the current signal transmitted from the first transmission unit is converted into voltage change by the current/voltage conversion unit. The reception unit also receives the voltage signal transmitted from the second transmission unit. The communication method switching unit switches between a current transmission method and a voltage transmission method in accordance with a predetermined communication rule. In the current transmission method, the communication signal is transmitted by the first transmission unit. In other words, in the current transmission method, the communication signal is transmitted from the first transmission unit of one of the plurality of communication terminals to the reception unit of another of the plurality of communication terminals. In the voltage transmission method, the communication signal is transmitted by the second transmission unit. In other words, in the voltage transmission method, the communication signal is transmitted from the second transmission unit of one of the plurality of communication terminals to the reception unit of another of the plurality of communication terminals.

In this case, the communication terminal is capable of operating while switching between the current transmission method, in which the communication signal is transmitted in the form of a current signal by the first transmission unit, and the voltage transmission method, in which the communication signal is transmitted in the form of a voltage signal by the second transmission unit. Hence, by using the current transmission method at normal times, for example, communication remains possible even when the impedance of the communication line decreases, and by switching to the voltage transmission method when power feeding from the power supply apparatus to the communication line is stopped, communication can be continued.

The communication terminal further comprises a line power feeding unit, a local power feeding unit, and a power feeding method switching unit. The line power feeding unit receives a supply of power from the power supply apparatus via the communication line. The local power feeding unit receives a supply of power from an external power supply without passing through the communication line. The power feeding method switching unit switches between the line power feeding method and the local power feeding method in accordance with a predetermined power feeding switching rule. In the line power feeding method, the communication terminal receives a supply of operating power from the line power feeding unit. In the local power feeding method, the communication terminal receives a supply of operating power from the local power feeding unit.

In this case, the communication terminal is capable of switching between the line power feeding method and the local power feeding method. Therefore, the line power feeding method in which the power supply is received from the power supply apparatus can be set at normal times, for example, and when power feeding from the power supply apparatus to the communication line is stopped, the power feeding method can be switched to the local power feeding method. As a result, communication can be continued.

Further, the power feeding method switching unit uses a power feeding switching rule determined such that during an operation of the current transmission method, the line power feeding method is selected. Furthermore, the power feeding switching rule used by the power feeding method switching unit is determined such that during an operation of the voltage transmission method, the local power feeding method is selected.

In this case, the communication terminal operates though the line power feeding method during an operation of the current transmission method, and operates though the local power feeding method during an operation of the voltage transmission method. As a result, a favorable power feeding method can be selected in accordance with the respective communication methods.

The power supply apparatus comprises stopping means. The stopping means stops power feeding to the communication line when an output falls below a prescribed value. The communication terminal further comprises a power feeding monitoring unit that monitors a power feeding condition on the communication line. The communication switching rule used by the communication method switching unit is determined such that when power feeding from the power supply apparatus to the communication line is stopped during an operation of the current transmission method, the communication method is switched to the voltage transmission method.

In this case, when the output of the power supply apparatus decreases due to a power cut or the like during an operation of the current transmission method such that communication though the current transmission method cannot be continued, the communication method is switched to the voltage transmission method, and as a result, communication can be continued.

The power supply apparatus further comprises stopping means. The stopping means stops power feeding to the communication line when an output falls below a prescribed value. The communication terminal further comprises a power feeding monitoring unit that monitors a power feeding condition on the communication line. The power feeding monitoring unit is configured to detect a condition in which power feeding from the power supply apparatus to the communication line has been stopped. The communication switching rule used by the communication method switching unit is determined such that when the power feeding monitoring unit detects the condition in which power feeding from the power supply apparatus to the communication line has been stopped, the voltage transmission method is selected.

Further, when the output equals or exceeds the prescribed value, the stopping means permits power feeding to the communication line.

The power feeding monitoring unit is also configured to detect a condition in which power feeding from the power supply apparatus to the communication line is underway. When the power feeding monitoring unit detects the condition in which power feeding from the power supply apparatus to the communication line is underway, the communication method switching unit selects the current transmission method.

In this case, when the output of the power supply apparatus decreases due to a power cut or the like during an operation of the current transmission method such that communication though the current transmission method cannot be continued, the communication method is switched to the voltage transmission method, and as a result, communication can be continued. Further, when the power supply apparatus is restored during the operation of the voltage transmission method, the communication method can be switched from the voltage transmission method to the current transmission method.

The communication terminal further comprises the capacity evaluation unit. The capacity evaluation unit determines the leeway value by subtracting the current value on the communication line from the current capacity of the power supply apparatus. The communication switching rule used by the communication method switching unit is determined such that when the leeway value determined by the capacity evaluation unit falls below a predetermined value during an operation of the current transmission method, the communication method is switched to the voltage transmission method. In other words, according to the communication switching rule used by the communication method switching unit, the communication method is switched to the current transmission method when two following conditions are satisfied. A first condition is that an operation is underway though the current transmission method. A second condition is that the leeway value determined by the capacity evaluation unit is lower than the predetermined value.

In this case, when leeway is lost in the current capacity of the power supply apparatus such that communication though the current transmission method becomes unstable, the communication method is switched to the voltage transmission method. As a result, stable communication can be continued. Note that cases in which communication though the current transmission method becomes unstable include, for example, a case in which the number of communication terminals is increased during an operation of the current transmission method.

The power supply apparatus has a current capacity. The communication terminal further comprises the capacity evaluation unit. The capacity evaluation unit is configured to determine the leeway value by subtracting the current value on the communication line from the current capacity. The communication method switching unit uses a communication switching rule according to which the voltage transmission method is selected when the leeway value falls below a predetermined value.

Further, the communication method switching unit uses a communication rule according to which the current transmission method is selected when the leeway value equals or exceeds a predetermined value.

In this case, when leeway is lost in the current capacity of the power supply apparatus due to an increase in the number of communication terminals or the like during an operation of the current transmission method such that communication though the current transmission method becomes unstable, the communication method is switched to the voltage transmission method. Then, when leeway is generated in the current capacity of the power supply apparatus, the communication method is switched back to the current transmission method from the voltage transmission method. As a result, stable communication can be continued.

The communication terminal further comprises a signal monitoring unit. The signal monitoring unit monitors a signal level of the voltage signal on the communication line. The communication switching rule used by the communication method switching unit is determined such that when the signal level of the voltage signal on the communication line falls below a predetermined value during an operation of the voltage transmission method, the communication method is switched to the current transmission method. In other words, the communication method switching unit uses a communication switching rule determined such that the communication method is switched to the current transmission method when two following conditions are satisfied. A first condition is that an operation is underway though the voltage transmission method. A second condition is that the signal level of the voltage signal on the communication line is lower than the predetermined value.

In this case, when communication though the voltage transmission method becomes unstable, stable communication can be continued by switching to the current transmission method. Cases in which communication though the voltage transmission method becomes unstable include, for example, a case in which the signal level of the voltage signal decreases due to a reduction in the impedance of the communication line during an operation of the voltage transmission method.

The communication terminal further comprises a signal monitoring unit. The signal monitoring unit monitors a voltage level of the voltage signal on the communication line. The communication method switching unit uses a communication switching rule according to which the current transmission method is selected when the signal level of the voltage signal on the communication line falls below a predetermined value.

Further, the communication method switching unit uses a communication rule according to which the voltage transmission method is selected when the signal level of the voltage signal on the communication line equals or exceeds a predetermined value.

In this case, when communication though the voltage transmission method becomes unstable, stable communication can be continued by selecting the current transmission method. When communication though the voltage transmission method is stable, on the other hand, the voltage transmission method can be selected.

Further, when communication though the voltage transmission method is determined to be stable during communication though the current transmission method, the communication method can be switched from the current transmission method to the voltage transmission method.

Furthermore, the second transmission unit is configured to apply a second voltage signal to the communication line periodically when the communication method switching unit has selected the current transmission method. The communication terminal further comprises a signal monitoring unit. The signal monitoring unit is configured to monitor a voltage level of the voltage signal on the communication line. The signal monitoring unit is configured to monitor a voltage level of the second voltage signal on the communication line. The signal monitoring unit is configured to determine whether or not the voltage level of the voltage signal has fallen below a predetermined value. The communication method switching unit uses a communication switching rule according to which the current transmission method is selected when the signal monitoring unit determines that the voltage level of the voltage signal on the communication line has fallen below the predetermined value. The signal monitoring unit is configured to determine whether or not the voltage level of the second voltage signal equals or exceeds a predetermined value. The communication method switching unit uses a communication switching rule according to which the voltage transmission method is selected when the signal monitoring unit determines that the voltage level of the second voltage signal on the communication line equals or exceeds the predetermined value.

Likewise in this case, when communication though the voltage transmission method becomes unstable, stable communication can be continued by selecting the current transmission method. When communication though the voltage transmission method is stable, on the other hand, the voltage transmission method can be selected.

Further, when communication though the voltage transmission method is determined to be stable during communication though the current transmission method, the communication method can be switched from the current transmission method to the voltage transmission method.

Further, the communication method switching unit uses a communication switching rule according to which the current transmission method remains selected when the signal monitoring unit determines that the voltage level of the second voltage signal on the communication line is lower than a predetermined value.

When communication using the voltage transmission method is determined to be stable during communication using the current transmission method, the communication method can be switched from the current transmission method to the voltage transmission method.

Further, the receiving unit comprises a first receiving unit and a second receiving unit. The first receiving unit is configured to receive the voltage signal of voltage change into which the current signal transmitted from the first transmission unit is converted through the current/voltage conversion unit. The second receiving unit is configured to receive the voltage signal transmitted from the second transmission unit.

Furthermore, the first receiving unit is configured to receive the voltage signal of voltage change into which the current signal transmitted from the first transmission unit is converted through the current/voltage conversion unit in a case where the communication method switching unit has selected the current transmission method in accordance with the communication switching rule. The second reception unit is configured to receive the voltage signal transmitted from the second transmission unit in a case where the communication method switching unit has selected the voltage transmission method in accordance with the communication switching rule.

In this case, when communication using the voltage transmission method becomes unstable, stable communication can be continued by switching to the current transmission method. When communication using the voltage transmission method is stable, on the other hand, the communication method can be switched to the voltage transmission method.

Note that the communication method switching unit includes a processing unit. The processing unit is configured to control the communication method switching unit in accordance with the communication switching rule such that the communication method switching unit switches between the current transmission method and the voltage transmission method in accordance with the communication switching rule.

Note that a monitored device is connected to the communication system. A device is connected to the monitored device. The monitored device is configured to obtain information to be transmitted from the device. At least one of the plurality of communication terminals is connected to the monitored device. The communication terminal connected to the monitored device is configured to obtain the information to be transmitted from the monitored device.

A monitoring device is also connected to the communication system. The monitoring device is configured to obtain the information to be transmitted, obtained by the monitored device from the device, from the monitored device. The monitoring device is connected to at least one of the plurality of communication terminals. The monitoring device is connected to a different communication terminal to the communication terminal to which the monitored device is connected. The communication terminal to which the monitoring device is connected is configured to obtain, via the communication line, a communication signal from the communication terminal to which the monitored device is connected.

Each of the communication terminals is configured to transmit the communication signal as a current signal from the first transmission unit of the communication terminal to the receiving unit of another communication terminal, when the communication method switching unit has selected the current transmission method. Further, each of the communication terminals is configured to transmit the communication signal as a voltage signal from the second transmission unit of the communication terminal to the receiving unit of another communication terminal, when the communication method switching unit has selected the voltage transmission method.

Second Embodiment

Figure 7:
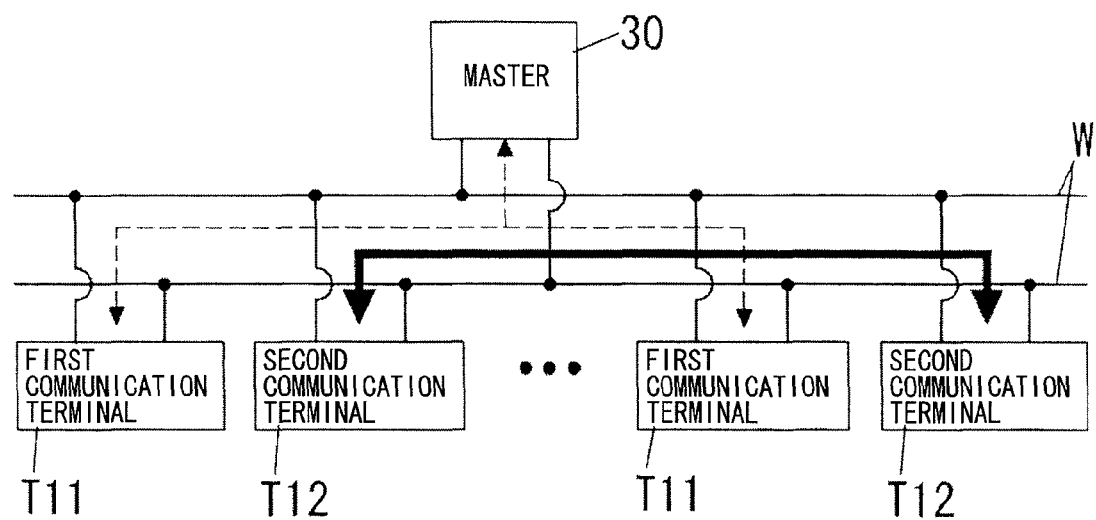
FIG. 7 is a schematic system diagram showing a configuration of a second embodiment of the present invention.

First, a basic configuration of a communication system according to this embodiment will be described. As shown in FIG. 7, this communication system is an NMAST (registered trademark) type communication system comprising a master (a transmission unit) 30 connected to a two-wire communication line W, and a plurality of first communication terminals T11 (two in the drawing) connected to the communication line W in order to communicate with the master 30. The communication system also includes a plurality of second communication terminals T12 (two in the drawing) connected to the communication line W in order to communicate with each other directly peer to peer (P2P).

The first communication terminals T11 always communicate with each other via the master 30, and since the master 30 polls the communication terminals T11, a communication speed is slow, making the system unsuitable for transmitting information including a comparatively large data amount, for example an analog amount (a measurement value of a power amount or the like). Further, when the master 30 breaks down or the like, the entire system stops, and therefore reliability as a communication system is poor. The second communication terminals T12, on the other hand, communicate with each other directly, and therefore the communication speed can be increased, enabling transmission of information including a comparatively large data amount.

In other words, from the viewpoints of communication speed and reliability, a communication system in which communication is performed directly, as by the second communication terminals T12, is desirable. Typically, however, communication systems in which communication is performed via the master 30, as by the first communication terminals T11, are more widespread. Therefore, to enable effective use of an existing communication system, a system configuration in which the first communication terminals T11 coexist with the second communication terminals T12, as shown in FIG. 7, is provided.

Here, the communication terminal T1 according to the first embodiment is used as the second communication terminal T12, while the power supply apparatus 3 according to the first embodiment is used as the master 30. In other words, the second communication terminal T12 is configured to be capable of switching the communication method between the current transmission method and the voltage transmission method and switching the power feeding method between the line power feeding method and the local power feeding method. Although omitted from FIG. 7, the current/voltage conversion unit 4 for converting current change on the communication line W into voltage change on the communication line W is provided between the master 30 and the communication line W.

Differences between the communication system according to this embodiment and the communication system according to the first embodiment will be described below.

The plurality of first communication terminals (terminal devices) T11 are connected to the master 30 in parallel through the communication line W. The master 30 and the first communication terminals T11 form a time division multiplexed transmission system (to be referred to hereafter as a "basic system") in which data transmission from the master 30 to the communication terminals T11 and data transmission from the first communication terminals T11 to the master 30 are performed through time division.

In the basic system, the first communication terminals T11 are divided into two types, namely a monitoring terminal device to which a switch, a sensor, and so on (not shown) are annexed, and a control terminal device to which a load (not shown) is annexed. Thus, the load annexed to the control terminal device can be controlled in accordance with first monitoring information from the switch, sensor, and so on annexed to the monitoring terminal device. Here, an address (an identifier) is set in each first communication terminal T11. The monitoring terminal device, having received the first monitoring information, transmits control information corresponding to the first monitoring information to the master 30. The master 30, having received the control information, transmits the control information to the control terminal device that is associated with the monitoring terminal device by the address. The control terminal device, having received the control information, controls the load in accordance with the control information. The control information for controlling the load reflects the first monitoring information, and therefore, although the master 30 is interposed between the monitoring terminal device and the control terminal device, the control information is transmitted over the communication line W such that the first monitoring information is reflected in control of the load.

Next, an operation of the basic system will be described.

The master 30 functions as a signal transmission unit (not shown) that transmits a transmission signal constituted by a voltage waveform having a format such as that shown in FIG. 8A to the communication line W. More specifically, the transmission signal comprises start signal bands A1, A2, a signal transmission band B for transmitting data to the first communication terminal T11, a signal return band C serving as a time slot for receiving a return signal from the first communication terminal T11, end signal bands D1, D2, and an idle band E. The transmission signal is a bipolar (±24 V) time division multiplexed signal on which data are transmitted by subjecting a carrier constituted by a pulse train to pulse width modulation.

In each first communication terminal T11, when address data included in the signal transmission band B of the transmission signal received via the communication line W match the address set in the corresponding first communication terminal T11, the control information for controlling the load is extracted from the transmission signal. Further, the first communication terminal T11 returns the control information as a current mode signal (a signal transmitted by short-circuiting the communication line W via an appropriate low impedance) in synchronization with the signal return band C of the transmission signal. Furthermore, a power supply for internal circuits of the first communication terminal T11 is supplied by rectifying and stabilizing a transmission signal transmitted via the communication line W.

At normal times, the master 30 performs normal polling by varying the address data included in the transmission signal cyclically and accessing the first communication terminals T11 in sequence. During normal polling, the first communication terminal T11 having the address that matches the address data included in the transmission signal operates after extracting the control information when the control information is included in the transmission signal, and transmits a return signal including an operating condition to the master 30.

Upon reception of an interrupt signal generated in one of the monitoring terminal devices in accordance with the first monitoring information, the master 30 performs interrupt polling by searching for the first communication terminal T11 that generated the interrupt signal, accessing the first communication terminal T11, and returning the control information corresponding to the first monitoring information.

In other words, at normal times, the master 30 performs normal polling by transmitting a transmission signal including cyclically varied address data to the communication line W. Further, when the master 30 detects the interrupt signal generated by the monitoring terminal device (the first communication terminal T11) in synchronization with the start signal band A1 or the end signal band D1 of the transmission signal, the master 30 transmits a transmission signal in which mode data are set in an interrupt polling mode. When an upper order bit of the address data in the interrupt polling mode transmission signal matches an upper order bit of the address of the first communication terminal T11 that generated the interrupt signal, a lower order bit of the address of the first communication terminal T11 is returned as return data in synchronization with the signal return band C of the transmission signal. As a result, the master 30 can obtain the address of the first communication terminal T1 that generated the interrupt signal.

Having obtained the address of the first communication terminal T11 that generated the interrupt signal, the master 30 transmits a transmission signal, to the first communication terminal T11, for requesting return of the control information, whereupon the first communication terminal T11 transmits the control information corresponding to the first monitoring information to the master 30. Having received the control information, the master 30 issues an instruction to clear the first monitoring information of the corresponding first communication terminal T11, whereupon the first communication terminal T11 returns a signal indicating that the first monitoring information has been cleared.

Having received the control information, the master 30 generates control information to be transmitted to the first communication terminal (control terminal device) T11 that is associated with the first communication terminal (monitoring terminal device) T11 serving as the transmission source of the control information through an address correspondence relationship. Further, the master 30 transmits a transmission signal including the control information to the communication line W in order to control the load annexed to the first communication terminal (control terminal device) T11.

In the basic system described above, the first communication terminals (the monitoring terminal device and the control terminal device) T11 communicate with each other via the master 30 in accordance with a polling/selecting method protocol (to be referred to hereafter as a first protocol).

In the communication system according to this embodiment, the plurality of second communication terminals T12 are connected to each other in parallel via the communication line W so as to share the communication line W with the basic system described above.

The second communication terminals T12 function to transmit data (second monitoring information) to another second communication terminal T12 without passing through the master 30 in accordance with a different protocol (to be referred to hereafter as a second protocol) to the first protocol. A signal of the second protocol has a higher wavelength than a signal of the first protocol, and differences in signal level and so on also exist between the signal of the first protocol and the signal of the second protocol. Therefore, the first communication terminal T11 and the second communication terminal T12 cannot communicate with each other despite being connected to the same communication line W.

More specifically, the second communication terminal T12 superimposes a packet including data to be transmitted to another second communication terminal T12 onto the transmission signal in accordance with the second protocol, transmits the resulting signal to the communication line W, and receives a packet of the second protocol from the other second communication terminal T12. In other words, communication between the first communication terminals T11 in accordance with the first protocol is performed via the master 30, as described above, whereas communication between the second communication terminals T12 in accordance with the second protocol is performed directly between the second communication terminals T12, independently of the master 30. Hence, communication using the second protocol can be performed at a higher communication speed than communication using the first protocol, and as a result, communication using the second protocol can be used to transmit information including a comparatively large amount of data, for example an analog amount (a measurement value of a power amount or the like).

When the line power feeding method is selected, the second communication terminal T12 operates upon reception of a power supply obtained by rectifying and stabilizing a transmission signal transmitted from the master 30 via the communication line W, similarly to the first communication terminals T11 of the basic system.

Further, the second communication terminal T12 monitors the transmission signal of the first protocol, transmitted between the master 30 and the first communication terminal T11 of the basic system, and analyzes a data transmission condition (to be referred to as a state hereafter) of the first protocol from the transmission signal. The second communication terminal T12 also functions to determine whether or not the state is suitable for packet transmission using the second protocol and transmit a packet at a timing determined to be suitable for transmission.

In other words, in the first protocol used by the basic system, a transmission signal formed by subjecting a carrier constituted by a pulse train to pulse width modulation is transmitted. When superimposing a packet of the second protocol onto the transmission signal, the packet is preferably superimposed in a period where the transmission signal is stable at a high level or a low level. The signal format shown in FIG. 8A is used for the transmission signal. Hence, in periods other than the signal transmission band B, a time during which the transmission signal is stable at the high level or the low level is relatively long, and therefore these periods (to be referred to as suitable communication periods hereafter) may be considered suitable for packet transmission.

In the signal transmission band B, on the other hand, the time during which the transmission signal is stable at the high level or the low level is relatively short, and signal transmission between the master 30 and the first communication terminal T11 using the first protocol is likely to have an effect. Hence, these periods (to be referred to as unsuitable communication periods hereafter) may be considered unsuitable for packet transmission.

Therefore, the second communication terminal T12 is configured to analyze the state of the transmission signal, determine whether a current period is a suitable communication period or an unsuitable communication period on the basis of an analysis result, and transmit a packet using the second protocol only when the current period is determined to be a suitable communication period (see FIG. 8B). By superimposing the packet of the second protocol on the transmission signal of the first protocol in synchronization with the transmission signal, interference between communication using the first protocol and communication using the second protocol on the shared communication line W can be avoided. Here, when a data amount of the transmission data is large such that the transmission data cannot be transmitted fully within a single suitable communication period, the second communication terminal T12 interrupts communication in accordance with the end of the suitable communication period and transmits the remaining data in a subsequent suitable communication period.

Further, the second communication terminal T12 according to this embodiment switches between the current transmission method and the voltage transmission method on the basis of the analysis result relating to the state of the transmission signal instead of the communication switching rules described in the first embodiment.

More specifically, in a period (return period) constituted by the signal return band C and the end signal bands D1, D2, which is a suitable communication period, the current mode signal is returned to the master 30 from the first communication terminal T11. Therefore, if the second communication terminal T12 transmits a current signal to the communication line W in the signal return band C and the end signal bands D1, D2, the current signal interferes with the current mode signal from the first communication terminal T11, leading to a communication error in the basic system. Hence, as shown in FIG. 8B, the communication method switching unit 13 is configured to switch to the voltage transmission method in the signal return band C and the end signal bands D1, D2, during which the current mode signal is returned to the master 30 from the first communication terminal T11, and to switch to the current transmission method in all other suitable communication periods.

Note, however, that in a system configuration where the first communication terminal T11 and the second communication terminal T12 coexist, a communication error may occur when the second communication terminal T12 communicates using the voltage transmission method, depending on the topology of the basic system and specifications of the first communication terminal T11. Therefore, communication using the voltage transmission method is preferably used to transmit information of low importance that need only be communicated successfully once every several times. Note that state analysis of the transmission signal is performed by the condition monitoring unit 17 described in the first embodiment and shown in FIG. 3.

All other configurations and functions are similar to those of the first embodiment.

As described above, the master includes a signal transmission unit that transmits a transmission signal constituted by a voltage signal to the communication line by varying a magnitude of the voltage applied to the communication line. A terminal device (the first communication terminal T11) that communicates with the master using the transmission signal is connected to the communication line.

In this case, when a communication system in which communication is performed between a master and a terminal device using a transmission signal already exists, communication between communication terminals (the second communication terminals T12) can be realized by making effective use of the communication line of the existing communication system.

Further, the terminal device functions to return a current mode signal, which is transmitted by short-circuiting the communication line via an appropriate low impedance, to the master in synchronization with a return period included in the transmission signal. The communication method switching unit uses the communication switching rule decided to perform communication through the voltage transmission method during the return period of the transmission signal. The communication method switching unit uses the communication switching rule decided also to perform communication through the current transmission method during a period other than the return period of the transmission signal.

Furthermore, the communication terminal is configured to monitor the transmission signal. The communication terminal is configured to recognize the return period by analyzing the transmission signal.

Note that the return period may also be referred to as a time slot corresponding to the return period.

Likewise in this case, the communication terminal operates using the voltage transmission method during the return period of the transmission signal and using the current transmission method during a period other than the return period of the transmission signal. As a result, interference between the current mode signal returned from the terminal device to the master and the current signal transmitted to the communication line by the first transmission unit of the communication terminal can be avoided.

EXPLANATION OF REFERENCE NUMERALS

3 power supply apparatus
4 current/voltage conversion unit
13 communication method switching unit
14 line power feeding unit
15 local power feeding unit
16 power feeding method switching unit
17 condition monitoring unit
18 capacity evaluation unit
Rx1 first receiving unit
Rx2 second receiving unit
T1 communication terminal
Tx1 first transmission unit
Tx2 second transmission unit
W communication line

The invention claimed is:

1. A communication system having a plurality of communication terminals connected to a two-wire communication line and a power supply apparatus that applies a voltage between two wires of said communication line, the communication system further having:
a current/voltage conversion unit that converts current change on said communication line into voltage change on said communication line by means of a voltage drop in an impedance component,
wherein said communication terminal comprises:
a signal generation unit that generates a communication signal on the basis of information to be transmitted;
a first transmission unit that is connected to said communication line and transmits a current signal to said communication line by changing a current flowing from said communication line in accordance with variation in said communication signal;
a second transmission unit that is connected to said communication line and applies said communication signal to said communication line as a voltage signal transmitted from said second transmission unit;
a receiving unit that receives a voltage signal of voltage change into which said current signal transmitted from said first transmission unit is converted through said current/voltage conversion unit, and also receives said voltage signal transmitted from said second transmission unit; and
a communication method switching unit that switches between a current transmission method in which said communication signal is transmitted through said first transmission unit and a voltage transmission method in which said communication signal is transmitted through said second transmission unit in accordance with a predetermined communication switching rule.

2. The communication system according to claim 1, wherein
said communication terminal further comprises:
a line power feeding unit that receives a supply of power from said power supply apparatus via said communication line;
a local power feeding unit that receives a supply of power from an external power supply without passing through said communication line; and
a power feeding method switching unit that switches between a line power feeding method in which a supply of operating power is received through said line power feeding unit and a local power feeding method in which a supply of operating power is received through said local power feeding unit in accordance with a predetermined power feeding switching rule.

3. The communication system according to claim 2, wherein said power feeding method switching unit uses said power feeding switching rule decided:
to select said line power feeding method during an operation of said current transmission method; and also
to select said local power feeding method during an operation of said voltage transmission method.

4. The communication system according to claim 1, wherein
said power supply apparatus comprises stopping means for stopping power feeding to said communication line when an output falls below a prescribed value,
said communication terminal further comprises a power feeding monitoring unit that monitors a power feeding condition on said communication line, and
said communication method switching unit uses said communication switching rule decided to switch to said voltage transmission method when power feeding from said power supply apparatus to said communication line is stopped during an operation of said current transmission method.

5. The communication system according to claim 1, wherein said communication terminal further comprises a capacity evaluation unit that determines a leeway value by subtracting a current value through said communication line from a current capacity of said power supply apparatus, and said communication method switching unit uses said communication switching rule decided to switch to said voltage transmission method when said leeway value determined by said capacity evaluation unit falls below a predetermined value during an operation of said current transmission method.

6. The communication system according to claim 1, wherein said communication terminal further comprises a signal monitoring unit that monitors a voltage signal level on said communication line, and said communication method switching unit uses said communication switching rule decided to switch to said current transmission method when said voltage signal level on said communication line falls below a predetermined value during an operation of said voltage transmission method.

7. The communication system according to claim 1, wherein said power supply apparatus comprises a signal transmission unit that transmits a transmission signal constituted by a voltage signal onto said communication line by varying a magnitude of said voltage applied to said communication line, and wherein a terminal device that communicates with said power supply apparatus using said transmission signal is connected to said communication line.

8. The communication system according to claim 7, wherein said terminal device functions to return a current mode signal, which is transmitted by short-circuiting said communication line via an appropriate low impedance, to said power supply apparatus in synchronization with a return period included in said transmission signal, and said communication method switching unit uses said communication switching rule decided:

to perform communication through said voltage transmission method during said return period of said transmission signal; and also to perform communication through said current transmission method during a period other than said return period of said transmission signal.

9. The communication system according to claim 1, wherein said power supply apparatus comprises stopping means for stopping power feeding to said communication line when an output falls below a prescribed value, said communication terminal further comprises a power feeding monitoring unit that monitors a power feeding condition on said communication line, said power feeding monitoring unit is configured to detect a condition in which power feeding from said power supply apparatus to said communication line has been stopped, and said communication method switching unit uses said communication switching rule decided to select said voltage transmission method when said power feeding monitoring unit detects said condition in which power feeding from said power supply apparatus to said communication line has been stopped.

10. The communication system according to claim 9, wherein said power feeding monitoring unit is configured to detect a condition in which power feeding from said power supply apparatus to said communication line is underway, and said communication method switching unit uses a communication switching rule decided to select said current transmission method when said power feeding monitoring unit detects said condition in which power feeding from said power supply apparatus to said communication line is underway.

11. The communication system according to claim 1, wherein said power supply apparatus has a current capacity, said communication terminal further includes a capacity evaluation unit, said capacity evaluation unit is configured to determine a leeway value by subtracting said current value through said communication line from said current capacity, and said communication method switching unit uses a communication switching rule according to which said voltage transmission method is selected when said leeway value falls below a predetermined value.

12. The communication system according to claim 11, wherein said communication method switching unit uses a communication switching rule according to which said current transmission method is selected when said leeway value equals or exceeds a predetermined value.

13. The communication system according to claim 1, wherein said communication terminal further comprises a signal monitoring unit that monitors a voltage signal level on said communication line, and said communication method switching unit uses a communication switching rule according to which said current transmission method is selected when said signal monitoring unit determines that said voltage signal level on said communication line has fallen below a predetermined value.

14. The communication system according to claim 13, wherein said communication method switching unit uses a communication switching rule according to which said voltage transmission method is selected when said signal monitoring unit determines that said voltage signal level on said communication line equals or exceeds a predetermined value.

15. The communication system according to claim 1, wherein said second transmission unit is configured to apply a second voltage signal to said communication line periodically when said communication method switching unit has selected said current transmission method, said communication terminal further comprises a signal monitoring unit, said signal monitoring unit is configured to monitor a voltage signal level on said communication line, said signal monitoring unit is configured to determine whether or not said voltage signal level on said communication line has fallen below a predetermined value, said communication method switching unit uses a communication switching rule according to which said current transmission method is selected when said signal monitoring unit determines that said voltage signal level on said communication line has fallen below said predetermined value, said signal monitoring unit is configured to determine whether or not said voltage level on said communication line equals or exceeds a predetermined value, and said communication method switching unit uses a communication switching rule according to which said voltage transmission method is selected when said signal monitoring unit determines that said voltage signal level on said communication line due to said second voltage signal equals or exceeds said predetermined value.

16. The communication system according to claim 15, wherein said communication method switching unit uses a communication switching rule according to which said current transmission method remains selected when said signal monitoring unit determines that said voltage signal level on said communication line due to said second voltage signal is lower than a predetermined value.

17. The communication system according to claim 1, wherein
said receiving unit comprises a first receiving unit and a second receiving unit,
said first receiving unit is configured to receive said voltage signal of voltage change into which said current signal transmitted from said first transmission unit is converted through said current/voltage conversion unit, and
said second receiving unit is configured to receive said voltage signal transmitted from said second transmission unit.

18. The communication system according to claim 17, wherein
said first receiving unit is configured to receive said voltage signal of voltage change into which said current signal transmitted from said first transmission unit is converted through said current/voltage conversion unit, when said communication method switching unit has selected said current transmission method in accordance with said communication switching rule, and
said second receiving unit is configured to receive said voltage signal transmitted from said second transmission unit, when said communication method switching unit has selected said voltage transmission method in accordance with said communication switching rule.

19. The communication system according to claim 8, wherein
said transmission signal includes said return period, and
said communication terminal is configured to monitor said transmission signal and thereby to recognize said return period.

20. The communication system according to claim 1, wherein
said communication method switching unit comprises a processing unit, and
said processing unit is configured to control said communication method switching unit in accordance with said communication switching rule such that said communication method switching unit switches between said current transmission method and said voltage transmission method in accordance with said communication switching rule.

21. The communication system according to claim 1, wherein
a monitored device is connected to said communication system,
a device is connected to said monitored device,
said monitored device is configured to obtain information to be transmitted from said device,
at least one of said plurality of communication terminals is connected to said monitored device, and said communication terminal connected to said monitored device is configured to obtain said information to be transmitted from said monitored device.

22. The communication system according to claim 21, wherein
a monitoring device is also connected to said communication system,
said monitoring device is configured to obtain said information to be transmitted, which is obtained by said monitored device from said device, from said monitored device,
at least one of said plurality of communication terminals is connected to said monitoring device,
a communication terminal to which said monitoring device is connected is different from said communication terminal to which said monitored device is connected, and
said communication terminal to which said monitoring device is connected is configured to obtain, via said communication line, a communication signal from said communication terminal to which said monitored device is connected.

23. The communication system according to claim 1, wherein
each of said communication terminals is configured to transmit said communication signal as a current signal from said first transmission unit of said communication terminal to said receiving unit of another communication terminal, when said communication method switching unit has selected said current transmission method, and
each of said communication terminals is configured to transmit said communication signal as a voltage signal from said second transmission unit of said communication terminal to said receiving unit of another communication terminal, when said communication method switching unit has selected said voltage transmission method.

24. The communication system according to claim 1, wherein said current/voltage conversion unit is configured to convert current change on said communication line into voltage change on said communication line by means of a voltage drop in a resistance component.

25. The communication system according to claim 2, wherein
said power supply apparatus comprises stopping means for stopping power feeding to said communication line when an output falls below a prescribed value,
said communication terminal further comprises a power feeding monitoring unit that monitors a power feeding condition on said communication line, and
said communication method switching unit uses said communication switching rule decided to switch to said voltage transmission method when power feeding from said power supply apparatus to said communication line is stopped during an operation of said current transmission method.

26. The communication system according to claim 3, wherein
said power supply apparatus comprises stopping means for stopping power feeding to said communication line when an output falls below a prescribed value,
said communication terminal further comprises a power feeding monitoring unit that monitors a power feeding condition on said communication line, and
said communication method switching unit uses said communication switching rule decided to switch to said voltage transmission method when power feeding from said power supply apparatus to said communication line is stopped during an operation of said current transmission method.

27. The communication system according to claim 2, wherein said communication terminal further comprises a capacity evaluation unit that determines a leeway value by subtracting a current value through said communication line from a current capacity of said power supply apparatus, and
said communication method switching unit uses said communication switching rule decided to switch to said voltage transmission method when said leeway value determined by said capacity evaluation unit falls below a predetermined value during an operation of said current transmission method.

28. The communication system according to claim 3, wherein said communication terminal further comprises a capacity evaluation unit that determines a leeway value by subtracting a current value through said communication line from a current capacity of said power supply apparatus, and
said communication method switching unit uses said communication switching rule decided to switch to said voltage transmission method when said leeway value determined by said capacity evaluation unit falls below a predetermined value during an operation of said current transmission method.

29. The communication system according to claim 2, wherein
said communication terminal further comprises a signal monitoring unit that monitors a voltage signal level on said communication line, and
said communication method switching unit uses said communication switching rule decided to switch to said current transmission method when said voltage signal level on said communication line falls below a predetermined value during an operation of said voltage transmission method.

30. The communication system according to claim 3, wherein
said communication terminal further comprises a signal monitoring unit that monitors a voltage signal level on said communication line, and
said communication method switching unit uses said communication switching rule decided to switch to said current transmission method when said voltage signal level on said communication line falls below a predetermined value during an operation of said voltage transmission method.

31. The communication system according to claim 2,
wherein said power supply apparatus comprises a signal transmission unit that transmits a transmission signal constituted by a voltage signal onto said communication line by varying a magnitude of said voltage applied to said communication line, and
wherein a terminal device that communicates with said power supply apparatus using said transmission signal is connected to said communication line.

32. The communication system according to claim 3,
wherein said power supply apparatus comprises a signal transmission unit that transmits a transmission signal constituted by a voltage signal onto said communication line by varying a magnitude of said voltage applied to said communication line, and
wherein a terminal device that communicates with said power supply apparatus using said transmission signal is connected to said communication line.

33. The communication system according to claim 2, wherein
said communication method switching unit comprises a processing unit, and
said processing unit is configured to control said communication method switching unit in accordance with said communication switching rule such that said communication method switching unit switches between said current transmission method and said voltage transmission method in accordance with said communication switching rule.

34. The communication system according to claim 3, wherein
said communication method switching unit comprises a processing unit, and
said processing unit is configured to control said communication method switching unit in accordance with said communication switching rule such that said communication method switching unit switches between said current transmission method and said voltage transmission method in accordance with said communication switching rule.

35. The communication system according to claim 2, wherein said current/voltage conversion unit is configured to convert current change on said communication line into voltage change on said communication line by means of a voltage drop in a resistance component.

36. The communication system according to claim 3, wherein said current/voltage conversion unit is configured to convert current change on said communication line into voltage change on said communication line by means of a voltage drop in a resistance component.

* * * * *